United States Patent [19]
Mueller et al.

[11] Patent Number: 6,151,202
[45] Date of Patent: Nov. 21, 2000

[54] DISCHARGING ELECTROSTATIC CHARGE DURING HOT CARD INSERTION

[75] Inventors: Mark Wayne Mueller; Peter Matthew Thomsen; Lucinda Mae Walter, all of Austin, Tex.

[73] Assignee: International Business Machines Corporation, Armonk, N.Y.

[21] Appl. No.: 09/271,838

[22] Filed: Mar. 18, 1999

[51] Int. Cl.[7] .................................................. H02H 1/00
[52] U.S. Cl. ........................... 361/212; 361/220; 361/111
[58] Field of Search .................................... 361/212, 220, 361/111, 56, 91.1, 91.2; 395/280–283

[56] References Cited

U.S. PATENT DOCUMENTS 5,164,880  11/1992  Cronin ..................................... 361/220
5,206,783  4/1993   Mori et al. ............................... 361/212
5,652,697  7/1997   Le ............................................ 361/788
5,680,274  10/1997  Palmer .................................... 360/104
5,708,552  1/1998   Han et al. ................................ 361/799
5,812,357  9/1998   Johansen et al. ....................... 361/212

Primary Examiner—Michael J. Sherry
Attorney, Agent, or Firm—Felsman, Bradley, Vaden, Gunter & Dillon, LLP

[57] ABSTRACT

A system for dissipating electrostatic build-up from a circuit card to a chassis ground within an electronic system, prior to connection of the circuit card with the electronic system. A circuit card has a card connector for connecting the circuit card into a backplane receptor within the electronic system. The circuit card includes a surface upon which an electrostatic charge may collect and also includes at least one conductive pad. A card guide aligns the circuit card such that the circuit card connects with the backplane receptor when said circuit card is fully inserted into the card guide. A conductive element within the card guide couples the conductive pad to a chassis ground within the electronic system when the circuit card is partially inserted into said the card guide.

14 Claims, 3 Drawing Sheets

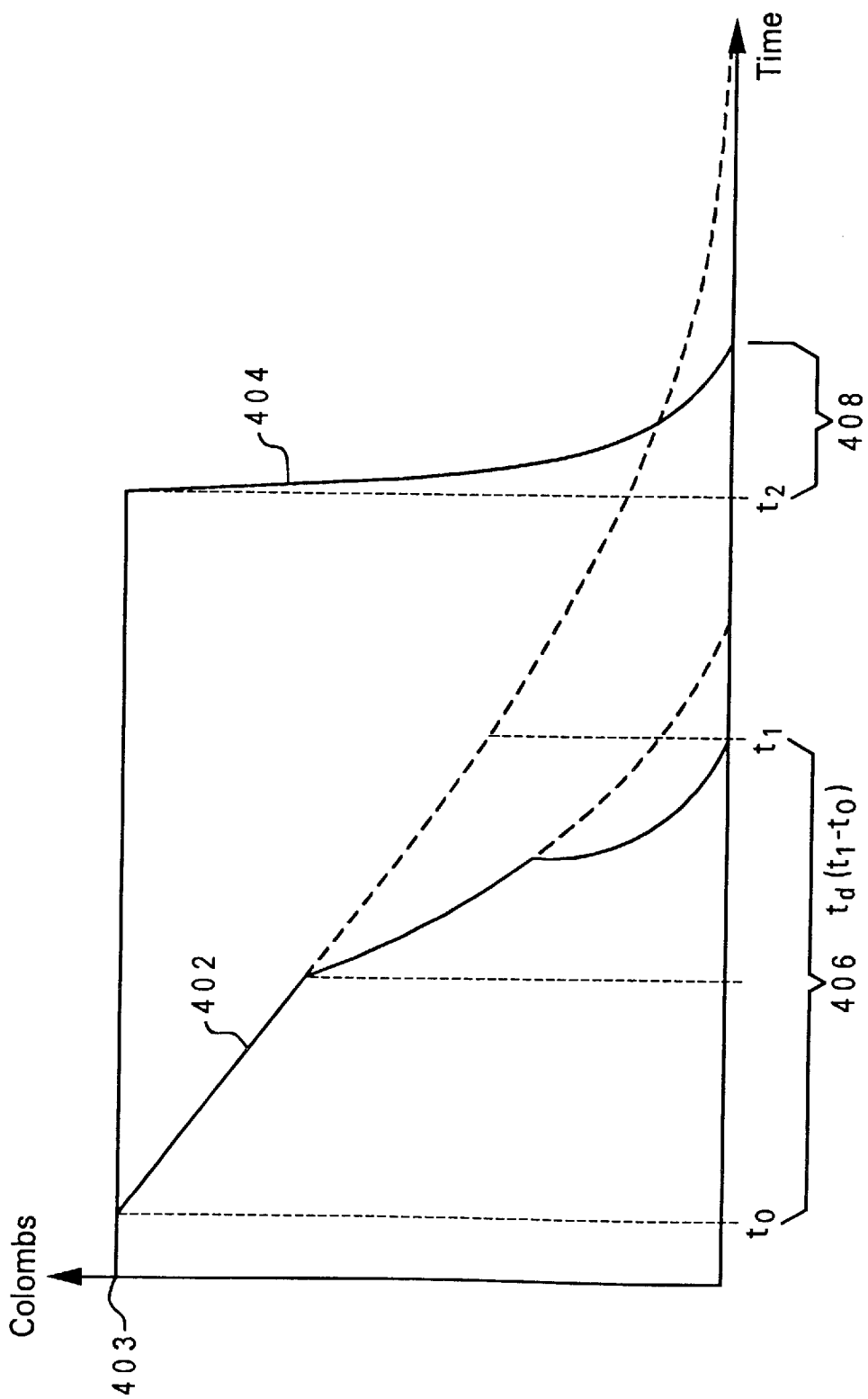

DISCHARGING ELECTROSTATIC CHARGE DURING HOT CARD INSERTION

BACKGROUND OF THE INVENTION

1. Technical Field

The present invention relates in general to electrostatic discharge protection for an integrated circuit card. In particular, the present invention relates to a method and system for dissipating electrostatic energy during insertion of a circuit card into an electronic system. Still more particularly, the present invention relates to a method and system that allow gradual release of electrostatic energy when a circuit card is inserted into an electronic system, such as a computer chassis.

2. Description of the Related Art

An electrostatic charge or static electricity accumulated on a human can reach levels of over 1000 volts. Modern computer circuitry utilizes voltages lower than 1.5 volts in a digital logic circuits. Consequently, the transfer of a static charge from a human or a circuit board into computer circuitry can cause serious damage to electronic circuitry. Such a static charge transfer is commonly referred to as "electrostatic discharge" or "ESD". Protection of electronic circuits from ESD has been an onerous problem since the advent of the transistor.

An electrostatic charge can build up on the surface of a person's body in many ways, including friction against surfaces such as carpet (i.e., triboelectric charging). When the fingertip of a charged human comes in close proximity to a conductor that is coupled to a circuit board, the accumulated charge rapidly discharges through every circuit coupled to the conductor. In such an ESD scenario, many sensitive circuits can be irreversibly damaged. Complementary metal-oxide semiconductor (CMOS) circuits and integrated circuits having small geometries are now widely utilized in the home and office. Environmental conditions in the home and office subject sensitive circuits to electrostatic discharge by humans. Heating and melt down due to electrostatic discharge presents serious reliability problems for deep sub-micron CMOS technology utilizing silicon junctions for ESD protection. As manufacturers attempt to increase the reliability of electronic equipment, prevention of ESD damage has become a primary concern.

Aside from physical damage to electronic components, an additional problem concerning ESD arises when a circuit card with an accumulated electrostatic charge is inserted into an activated electronic system. An increasing number of electronic systems are designed to be activated at all times. A categorical example of such a full-time operational system is a computer network server system. Such systems are designed such that circuit cards may be added, removed, or serviced while the system is running. In addition to the danger of physical component damage, the operations of an activated system may be significantly disrupted due to electrical transients resulting from an ESD that occurs when a circuit card is inserted into such a system.

A common method of providing ESD protection is simply to ensure that the circuit card, and the person inserting the card, are both grounded prior to and during card insertion. Grounding the circuit card may be accomplished by utilizing a "grounding strap" to electrically connect the system chassis to the person in contact with the card, such that electrostatic charge will not accumulate on the card. Such a method of ESD protection, if implemented alone, leaves a substantial risk of human error or neglect. A user either may not properly attach the grounding strap or may fail to utilize the strap at all, thus leaving the circuitry aboard the circuit card vulnerable to ESD damage and also risking a disruption in the electrical operation of the system into which the card is inserted. Other methods of ESD protection such as utilizing grounding mats are similarly deficient.

A wide variety of designs for accomplishing on-chip ESD protection have been developed. The primary function of an ESD protection circuit is to direct an ESD away from the circuit to be protected. One such method implemented to protect electronic circuits from ESD damage is to incorporate filters on the input of integrated circuits. ESD filters are typically comprised of resistors and diodes or any combination thereof. FIG. 1 depicts a typical ESD filter circuit which utilizes resistors and reverse-biased diodes for de-coupling ESD transients.

The resistance and the inherent capacitance associated with reverse-biased diodes and other components significantly slow down the attainable data transmission speed of an integrated circuit. Therefore, state-of-the-art microprocessors cannot attain data transmission and reception of digital data on the order of hundreds of megahertz to one gigahertz due to the degradation of parasitic characteristics inherent in existing ESD filter designs.

Traditional on chip ESD protection circuit designs, such as that depicted in FIG. 1, involve a trade off between increased capacitance on the input/output (I/O) transmission line and the transient voltage dissipation capacity.

From the foregoing it can be appreciated that there is a need for improved electrostatic discharge protection when a circuit card is plugged-in and unplugged from a computer chassis.

SUMMARY OF THE INVENTION

It is therefore one object of the present invention to provide improved electrostatic discharge protection for an integrated circuit card.

It is another object of the present invention to dissipate electrostatic energy during insertion of a circuit card into a computer chassis but prior to connection of the circuit card with an electronic system.

It is yet another object of the present invention to provide a method and system for allowing the gradual release of electrostatic energy when a circuit card is inserted into an electronic system, such as a computer chassis.

The foregoing objects are achieved as is now described. A circuit card has a card connector for connecting the circuit card into a backplane receptor within the electronic system. The circuit card includes a surface upon which an electrostatic charge may collect and also includes at least one conductive pad. A card guide aligns the circuit card such that the circuit card connects with the backplane receptor when said circuit card is fully inserted into the card guide. A conductive element within the card guide couples the conductive pad to a chassis ground within the electronic system when the circuit card is partially inserted into the card guide.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 is an output response curve illustrating a gradual dissipation of electrostatic charge resulting from implementation of the present invention.

DETAILED DESCRIPTION OF ILLUSTRATIVE EMBODIMENT

Static electricity is generally defined as an electrical charge caused by an imbalance of electrons on the surface of an object. This imbalance of electrons produces an electric field that can be measured and that can influence other objects not in direct physical contact. "Electrostatic discharge" (ESD) as utilized herein is defined as the transfer of charge between objects at different potentials. ESD is usually caused by one of two events: direct discharge to the device or electrostatic discharge from the device to a grounded source. The present invention addresses the transfer of electric charge or ESD to or from a circuit card during its insertion into a computer chassis. It is well known that integrated circuitry, particularly in sub-micron technologies are susceptible to damage caused by ESD.

In the preferred embodiment illustrated in the following figures, a charge dissipation system is contemplated to address a common scenario in which a circuit card is inserted into the backplane of an electronic system. In the depicted example, the circuit card has a circuitry connector residing on one edge that is plugged into a backplane receptor. In such a scenario, the circuit card is guided by card guides, such that a circuit card circuit connector mechanically and electrically engages the backplane receptor. It is at the instant the card connector contacts metallic elements within the backplane receptor, that ESD and resulting catastrophic or latent electronic damage conventionally occur.

Figure 2:
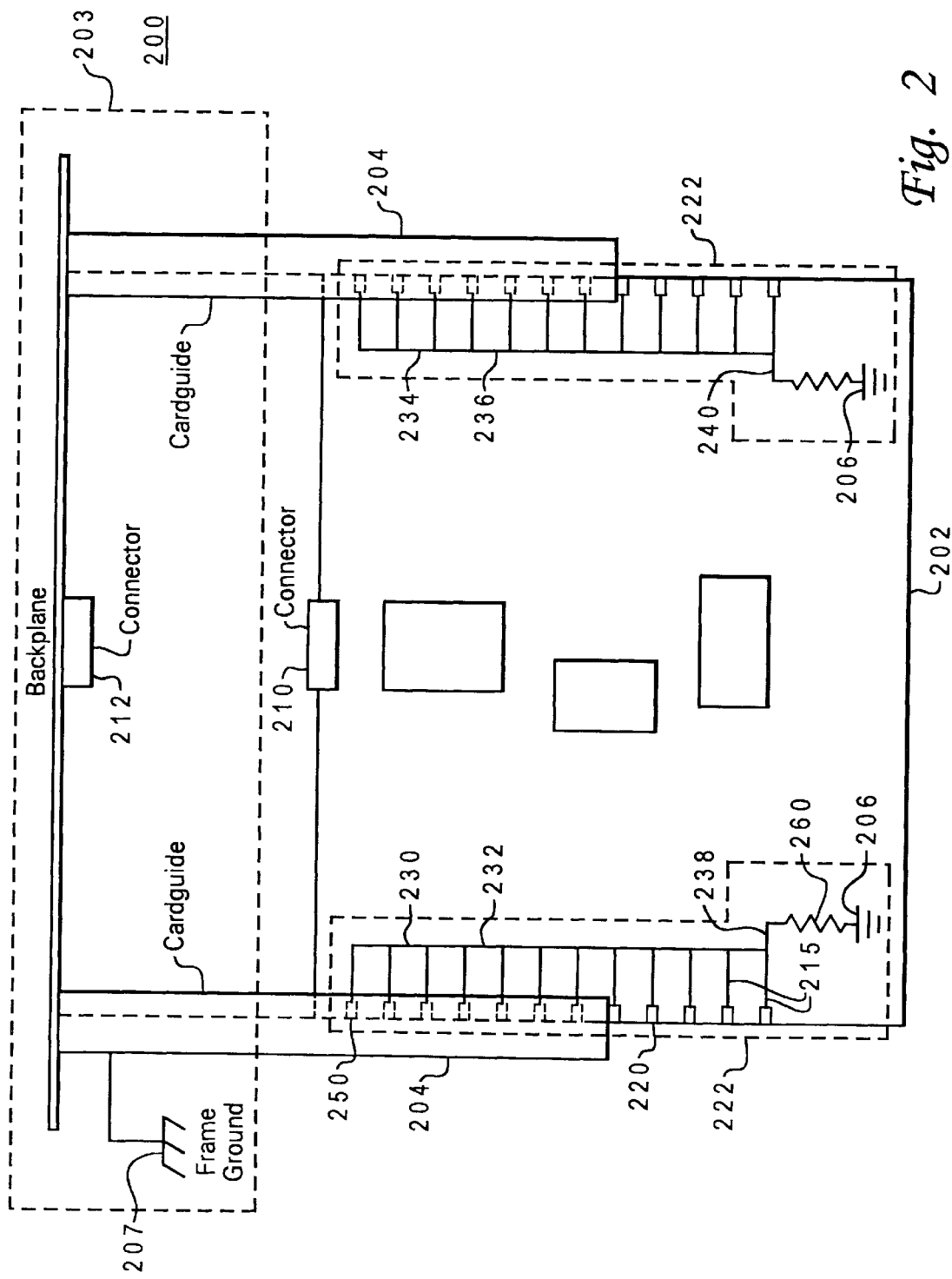
FIG. 2 depicts a system for controlled dissipation of electrostatic energy.

With reference now to the figures and in particular with reference to FIG. 2, there is depicted an electrostatic charge dissipation system 200, in accordance with a preferred embodiment of the present invention. In evolving computer systems, such as electronic system 203, it is desirable to allow personnel the ability to service, add or replace various electronic printed circuit cards in the system. In order to facilitate this replacement, card guides 204, which are commonly channel shaped, are typically utilized to align a circuit card 202 during the process of insertion.

Card guides 204 align circuit card connector 210 with chassis receptor 212 prior to engagement of pins within circuit card connector 210 with chassis receptor 212. Chassis receptor 212 commonly resides in a mother board or a back plane and can be referred to as a backplane connector.

There are many ways in which electrostatic energy may accumulate on circuit card 202 prior to circuit card 202 being inserted into electronic system 203. One possible source of such an accumulation would be from a charge transfer from a person or an object that has accumulated a electrostatic charge on its surface. A common cause of any such accumulation is friction due to a shifting mechanical contact. A typical example is the electrostatic charge that may build up on a person who is shuffling his or her feet on a carpeted surface.

Another potential source of electrostatic accumulation is directly related to inherent characteristics of a typical computer system, such as electronic system 203. Often heated exhaust air flows through the area in which card guides or channel exist. If card guides 204 are made out of an insulating material card guides 204 are susceptible to the build-up of static electricity. Further, static charges can build up on a circuit card 202 from handling the circuit card outside of the computer chassis.

Electrostatic charge may accumulate on circuit card 202 prior to and during insertion of circuit card 202 into card guides 204. Therefore, sliding a circuit card 202 into card guides 204 may result in the release of a damaging surge of electricity. In the depicted embodiment, card guides 204 are electrically connected to chassis ground 207 utilizing a conductive element within each of card guides 204. Although not explicitly depicted in FIG. 2, the conductive elements within card guides 204 are depicted as conductive element 316 in FIG. 3. Chassis ground 207 is part of a robust system ground which can dissipate a considerable charge.

Conductive pads 220 are located near the edge of circuit card 202 such that the overlap of card guides 204 onto circuit card 202 can made contact with conductive pads 220 and any electrical potential which exist between circuit card 202 and card guides 204 can be reduced and eventually dissipated. The edge of circuit card 202 has exposed conductive pads 220. Exposed conductive pads 220 make contact with chassis ground 207 via conductive element 316 within card guides 204. In accordance with an important feature of the present invention, when circuit card 202 is inserted into card guides 204, conductive element 316 electrically couples at least one of conductive pads 220 to chassis ground 207. In this manner, any electrostatic energy that has accumulated prior to or during insertion, is dissipated by controlled means into the grounding system of electronic system 203 via chassis ground 207. In addition, by grounding chassis ground 207, a triboelectric charge that might otherwise accumulate on card guides 204 due to friction from card insertion or dry air blowing over card guides 204, is prevented. Conductive pads 220 are manufactured utilizing standard printed circuit board techniques.

Upon insertion of circuit card 202 into card guide 204, the edge containing conductive pads 220 on circuit card 202 will connect the ground planes or ground circuits of circuit card 202 to chassis ground 207 through ESD dissipation circuit 222 and card guides 204.

In the embodiment depicted in FIG. 2, the rate of the ESD will be limited by a variable impedance path having a series of discrete resistive or inductive values. The extremely fast rise times of ESD pulses are detrimental to silicon junctions. Sliding circuit card 202 into and along the surface of circuit card guides 204 provides ample time to discharge any static voltage build-up before the engaging connectors can damage electronics within circuit card 202.

In accordance with a preferred embodiment of the present invention, an ESD protection circuit 222 includes resistors 230, 232, 234, and 236, each having a relatively high resistance value such as 10K Ohms. Additionally ferrite beads such as first ferrite bead 238 and second ferrite bead 240 are incorporated into ESD protection circuit 222 to provide inductive impedance to an ESD surge, thus providing additional filtering for ESD. The impedance of these components can be selected to tailor the system to a desired response. Consistent with the spirit and scope of the present invention, any combination of electrical or electronic devices that provide adequate impedance to an ESD surge may also be incorporated within ESD protection circuit 222.

Allowing circuit card connector 210 and chassis connector 212 to contact each other before dissipation of electrostatic build-up can provide an electrostatic build-up to dissipate into circuit which is very sensitive to energy pulses. Typically, connectors of a circuit card provide a direct, uninterrupted and low impedance path for an ESD to travel into sub-micron electrical devices. The present invention controls ESD by allowing ESD to dissipate in stages, yet completely dissipate before circuit card connector 210 and chassis connector 212 make contact.

As circuit card 202 is inserted into card guides 204, electrical contact is initially made when first pad 205 (illustrated with card guide 204 cut away) contacts card guide 204. At the instant initial contact is made, an accumulated ESD begins to discharge through the entire series impedance network comprised of resistors 230, 232, 234, and 236, and also comprising ferrite beads 238 and 240. As insertion continues, parallel conductive paths 215 cause successive series resistors to be shorted and therefore, effectively eliminated from the total effective resistance of ESD protection network 222. The effective impedance of ESD protection network 222 is that impedance measured from the ground plane 206 of circuit card 202 to the chassis ground 207 via card guides 204.

Initially, the effective impedance of ESD protection network 222 is at its maximum level. As can be seen in FIG. 2, as circuit card 202 is inserted further into card guide 204, more of the resistors in ESD protection circuit 222 are electrically shorted to chassis ground; thus, the effective resistance is lowered between circuit card 202 and chassis ground 207, allowing the electrostatic charge to dissipate progressively faster until completely dissipated.

In an illustrative embodiment, each impedance device within ESD protection network 222 may be a 10K Ohm resistor. In this embodiment, initial contact of pad 250 with card guides 204 would have an effective resistance to ground of 60K Ohms, and as each pair of conductive pads contact card guides 204, the equivalent resistance to chassis ground would drop accordingly to 50K, 40K . . . 10K Ohms.

It is preferred that base resistors 260 has a small value such as 2 Ohms to assure complete discharge of any electrostatic potential. Base resistor 260 retains a minimal value of resistance between the ground plane on circuit card and conductive surfaces 220 to disrupt any ground loops which could result from providing multiple ground paths. A resistor of only nominal value is required to break ground loops that can occur in a system when the logic signals and voltages are connected through the connector and multiple ground paths are provided.

Figure 1:
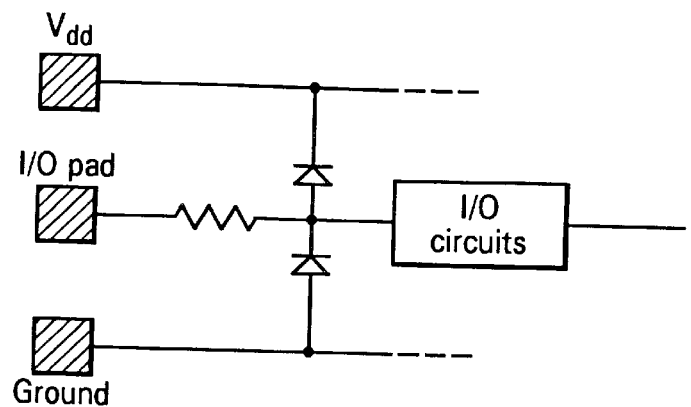
FIG. 1 illustrates a prior art electrostatic discharge protection system.
Figure 3:
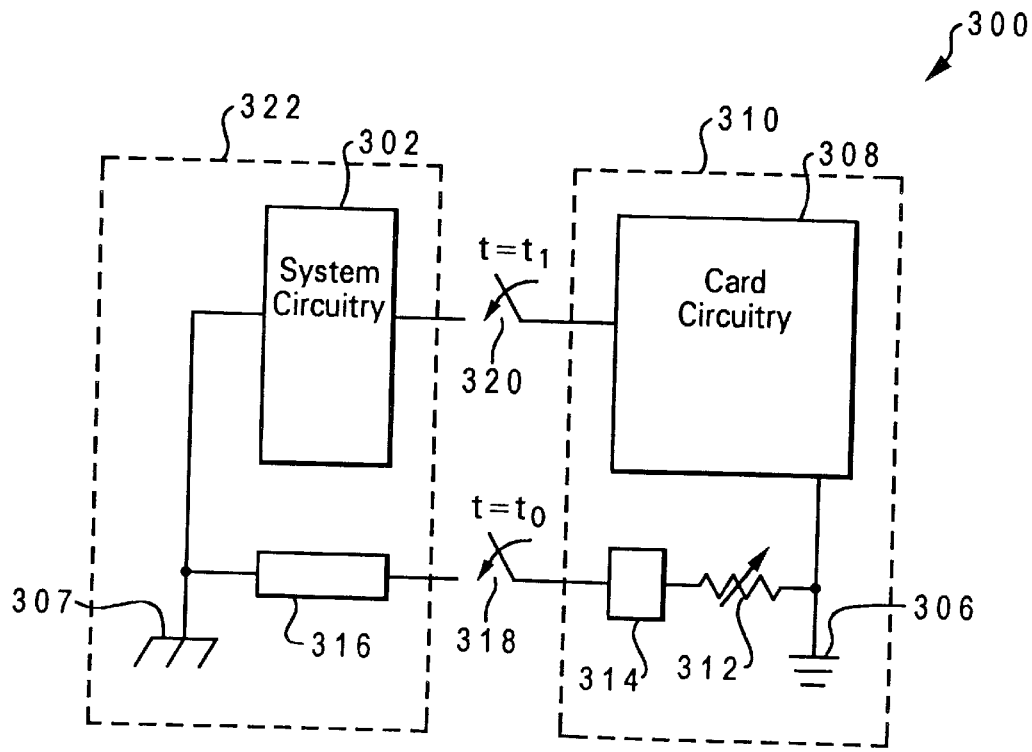
FIG. 3 illustrates a simplified equivalent circuit of the system and method depicted in FIG. 2.

With reference now to FIG. 3, there is depicted a simplified equivalent circuit diagram representative of electrostatic charge dissipation system 200. Electrostatic charge dissipation circuit 300 is comprised of devices residing on both a printed circuit card 310 and an electronic system chassis 322. Printed circuit card 310 is comprised of card circuitry 308 that is electrically connected to conductive pad 314 through variable impedance network 312. In the example illustrated in FIG. 3, the common node between card circuitry 308 and variable impedance network 312 is a ground plane 306 residing on printed circuit card 310.

Electronic system chassis 322 is comprised of system circuitry 302 that, in the depicted example, is electrically connected to a chassis ground 307. It will be understood and appreciated by those skilled in the art that a chassis ground, such as chassis ground 307, is one of several sources of reference voltage levels within a typical electronic system. Also included within electronic system chassis 322 is a conductive element 316 that in electrostatic charge dissipation system 200 of FIG. 2, would reside within card guides 204. Conductive element 316 is constructed within cardguides 204 to make direct electrical contact with conductive pad 314 when printed circuit card 310 is inserted into cardguides 204.

A first switch 318, represents the contact, or lack thereof, between conductive pad 314 and conductive element 316. While switch 318 is open, circuit card 310 is not being inserted into card guides 204. A second switch 320 represents the mutual contact or non-contact between card circuitry 308 and system circuitry 302. Card circuitry 308 represents the collection of devices that interact with system circuitry 302 in accordance with the design of printed circuit card 310. As an example, if printed circuit card 310 is a memory card, card circuitry 308 would be comprised of integrated circuitry utilized for memory functions.

At the time switch 318 is open, as depicted in FIG. 3, there is no physical contact between printed circuit card 310 and electronic system chassis 322. At the first instant at which switch 318 closes, first contact is made between printed circuit card 310 and electronic system chassis 322. The time period following this initial contact, but before second switch 320 closes, is the interval over which electrostatic energy accumulated on printed circuit card 310 will discharge through variable impedance network 312 in accordance with the teachings of the present invention. The length of this time period will be determined by how quickly the full insertion of printed circuit card 310 occurs, and will vary in accordance with, among other factors, the distance printed circuit card 310 must travel along card guides 204.

The closing of switch 320 signifies the point in time at which printed circuit card 310 has been fully inserted into its card guides after initial contact as depicted by the closing of switch 318. After switch 320 has closed, all electrostatic energy residing on printed circuit board 310 has been completely dissipated into chassis ground 307.

Turning now to FIG. 4, two electrostatic discharge response curves are superimposed on the same timeline to illustrate the ESD protection provided by the method and system of the present invention. An initial electrostatic charge level 403 represents the charge differential existing across system chassis 307 and circuit card 310 of FIG. 3. A first response curve 402, illustrates the controlled dissipation of electrostatic charge level 403 through variable impedance network 312, conductive pads 314 and card guide conductor 316, which together comprise the electrostatic protection system of FIG. 3. As seen in FIG. 4, response curve 402 extends over a discharge time 406 which corresponds to the time interval that begins at time $t_0$ when switch 318 closes (printed circuit card 202 has made initial contact with card guides 204), and concludes at time $t_1$ when switch 320 closes (circuit card 320 fully inserted into card guides 204). Referring back to FIG. 2, it will be recalled that as the circuit card is further inserted into the card guides, impedance elements are incrementally shorted. The effect of this incremental decrease in total resistance is evident at the points of discontinuity on response curve 402 in which the curve assume a steeper slope that corresponds to a faster charge dissipation.

Electrostatic charge dissipation curve 404 is superimposed on the same timeline to depict the rapid charge dissipation which will occur when metal-to-metal contact is made between card connector 210 and backplane receptor 212 at time $t_2$. It should be noted that in the absence of the electrostatic protection system of the present invention, an ESD spike will commence at time $t_2$ when card connector 210 contacts backplane receptor 212 with the potential for catastrophic damage to circuitry residing within the circuit card.

The method and system of the present invention slows the propagation velocity and the rise time of electrostatic discharges. Further damage prevention can be achieved for sensitive components within the main chassis of the computer (not shown) which are coupled to a backplane receptor such as backplane receptor 212.

While the invention has been particularly shown and described with reference to a preferred embodiment, it will be understood by those skilled in the art that various changes in form and detail may be made therein without departing from the spirit and scope of the invention.

What is claimed is:

1. A system for dissipating electrostatic build-up from a circuit card to a chassis ground within an electronic system prior to connection of said circuit card with said electronic system, said circuit card having a card connector for connecting said circuit card into a backplane receptor within said electronic system, said system comprising:

a circuit card having a surface upon which an electrostatic charge may collect, said surface including at least one conductive pad;

a card guide for aligning said circuit card such that said circuit card connect with said backplane receptor when said circuit card is fully inserted into said card guide; and a conductive element within said card guide for coupling said at least one conductive pad to a chassis ground within said electronic system when said circuit card is partially inserted into said card guide, such that an electrostatic charge residing on said circuit card may dissipate in a controlled manner into said chassis ground prior to contact of said circuit card connector with said backplane receptor.

2. The system of claim 1, further comprising:

a circuit card connector coupled to said circuit card for insertion into said backplane receptor, wherein said at least one conductive pad engages said card guide before said circuit card connector engages said backplane receptor.

3. The system of claim 1, wherein said at least one conductive pad is located at the edge of said circuit card, such that said at least one conductive pad electrically contacts said conductive element within said card guide when said circuit card is inserted into said card guide.

4. The system of claim 1 wherein said card guides are constructed of a conductive material.

5. The system of claim 1, wherein said circuit card includes a ground plane upon which electrostatic energy may reside, said system further comprising an electrical impedance network for coupling said at least one conductive pad to said circuit card ground plane.

6. The system of claim 5 wherein said circuit card includes a plurality of circuit devices, and wherein said ground plane is electrically connected to said circuitry.

7. The system of claim 5 wherein said electrical impedance network includes at least one resistor.

8. The system of claim 5 wherein said electrical impedance network includes at least one inductive element.

9. The system of claim 8 wherein said inductive element is characterized as among a group consisting of inductors and ferrite beads.

10. The system of claim 5 wherein said electrical impedance network includes at least one resistor and at least one inductive element.

11. The system of claim 1 wherein said backplane receptor includes an interface for electrically engaging circuitry residing on said circuit card.

12. The system of claim 11 further comprising an activated electronic system in which said backplane receptor resides.

13. The system of claim 12 wherein said activated electronic system is a digital computer system.

14. A system for dissipating electrostatic build-up from a circuit card to a chassis ground within an electronic system prior to connection of said circuit card with said electronic system, said circuit card having a card connector for coupling said circuit card into a backplane receptor within said electronic system, said method comprising the steps of:

providing a circuit card having a surface upon which an electrostatic has accumulated;

providing a card guide for aligning said circuit card, such that said circuit card connects with said backplane receptor when said circuit card is fully inserted into said card guide;

depositing a conductive element within said card guide, for conductive element for coupling said at least one conducive pad to a chassis ground within said electronic system when said circuit card is partially inserted into said card guide; and depositing at least one conductive pad onto said circuit card, such that said conductive pad electrically contacts said conductive element on said card guide.

* * * * *